(12) United States Patent
Zajchowski et al.

(10) Patent No.: US 7,696,633 B2
(45) Date of Patent: Apr. 13, 2010

(54) FLOATING POWER GENERATION DEVICE AND SYSTEM

(76) Inventors: Thomas T. Zajchowski, 38 Upper New Hampton Rd., Meredith, NH (US) 03253; Kathy J. Zajchowski, 38 Upper New Hampton Rd., Meredith, NH (US) 03253

( * ) Notice: Subject to any disclaimer, the term of this patent is extended or adjusted under 35 U.S.C. 154(b) by 377 days.

(21) Appl. No.: 11/894,212

(22) Filed: Aug. 20, 2007

(65) Prior Publication Data

US 2008/0203729 A1 Aug. 28, 2008

Related U.S. Application Data

(60) Provisional application No. 60/838,427, filed on Aug. 18, 2006.

(51) Int. Cl.
*F03B 13/00* (2006.01)
*F03B 13/10* (2006.01)

(52) U.S. Cl. .......................... 290/54; 290/43

(58) Field of Classification Search ................ 290/42, 290/43, 53, 54; 415/7, 8
See application file for complete search history.

(56) References Cited

U.S. PATENT DOCUMENTS

| | | | | | |
|---|---|---|---|---|---|
| 4,516,033 | A | * | 5/1985 | Olson | 290/54 |
| 4,598,210 | A | * | 7/1986 | Biscomb | 290/43 |
| 4,843,249 | A | * | 6/1989 | Bussiere | 290/53 |
| 5,451,137 | A | * | 9/1995 | Gorlov | 415/7 |
| 5,471,098 | A | * | 11/1995 | Asay | 290/54 |
| 6,551,053 | B1 | * | 4/2003 | Schuetz | 415/3.1 |
| 6,935,832 | B1 | * | 8/2005 | Platt et al. | 415/8 |
| 7,042,113 | B2 | * | 5/2006 | Aukon | 290/54 |
| 7,465,147 | B2 | * | 12/2008 | Platt et al. | 415/7 |
| 7,554,215 | B1 | * | 6/2009 | Caragine | 290/42 |
| 7,602,076 | B1 | * | 10/2009 | Sipp | 290/54 |

* cited by examiner

*Primary Examiner*—Nicholas Ponomarenko
(74) *Attorney, Agent, or Firm*—Lawson & Persson, P.C.; Michael J. Persson; Catherine E. Napjus

(57) ABSTRACT

A floating power generating device that includes a support frame having a pair of buoyant pontoons, a power generator mounted to the support frame between the pontoons, an electrical cable in electrical communication with the power generator, and means for maintaining the floating power generating device in a substantially fixed position within the flow of water.

20 Claims, 4 Drawing Sheets

FLOATING POWER GENERATION DEVICE AND SYSTEM

CLAIM OF PRIORITY

This application claims the benefit of priority of U.S. Provisional Patent Application Ser. No. 60/838,427, filed on Aug. 18, 2006.

FIELD OF THE INVENTION

The present invention relates to the general art of power generation and, in particular, to the field of hydroelectric power generation.

BACKGROUND OF THE INVENTION

The wealth of the United States has been created largely through the exploitation of cheap energy provided by the past abundance of fossil fuels. Because of the increasing shortages of natural gas in North America and the approaching worldwide shortages of oil, and because of the growing danger of global warming caused by the combustion of fossil fuels, reliable sources of renewable energy are needed.

A growing percentage of the efforts to utilize renewable sources of energy have been concentrated in the creation of wind farms. Although wind powered generating systems should be encouraged, they do have a problem: wind energy is inherently intermittent. Wind speeds can fluctuate hourly and have marked seasonal and diurnal patterns. They also frequently produce the most power when the demand for that power is at its lowest. This is known in the electricity trade as a low capacity factor. Low capacity factors, and still lower dependable on-peak capacity factors, are the major source of wind power's problem.

Because of the steadiness of the Coriolis force driven ocean currents, submersible generators can have capacity factors equal to those of many fossil fuel plants. The fact that these ocean currents can produce a steady supply of electricity makes that power much more valuable than the intermittent power produced by the wind-driven turbines. For submersible turbines to achieve high capacity factors, however, proper placement is very important.

Ocean currents flow at all depths in the ocean, but the strongest usually occur in the upper layer, which is shallow compared to the depth of the oceans. The main cause of surface currents in the open ocean is the action of the wind on the sea surface. A wind of high constancy, blowing over great stretches of an ocean, have the greatest effect on producing current. It is for this reason that the north-west and south-east trade winds of the two hemispheres are the mainspring of the oceans surface current circulation. In the Atlantic and Pacific oceans, the two trade winds drive an immense body of water westward over a width of some 50 degrees of latitude, broken only by the narrow belt of the east-going Equatorial Countercurrent, which is found a few degrees north of the equator in both of these oceans. A similar westward flow of water occurs in the South Indian Ocean, driven by the south-east trade wind. These westward surface currents produce giant eddies that are centered in latitudes of approximately 30° N. and S. that rotate clockwise in the northern hemisphere and counter-clockwise in the southern hemisphere. Currents of over 3.5 mph are confined to very restricted regions. They have been recorded in the equatorial regions of the oceans, and in the warm currents flowing to higher latitudes in the western sides of the oceans, with the exception of the Brazil current. The book, Ocean Passages of the World (published by the Hydrographic Department of the British Admiralty, 1950), lists fourteen currents that exceed 3 knots (3.45 mph), a few of which are in the open ocean. The Gulf Stream and the Kuro Shio are the only two currents the book lists having velocities above 3 knots that flow throughout the year. Both of these currents are driven by the Coriolis force that is caused by the Earth's eastward rotation acting upon the ocean currents produced by the trade winds. Because these currents are caused by the Earth's rotation, they will continue flowing as long as our planet continues to turn on its axis.

The Gulf Stream starts roughly in the area where the Gulf of Mexico narrows to form a channel between Cuba and the Florida Keys. From there the current flows northeast through the Straits of Florida, between the mainland and the Bahamas, flowing at a substantial speed forsome 400 miles. It hits its peak velocity off Miami, where the Gulf Stream is about 45 miles wide and 1,500 feet deep. There the current reaches speeds of as much as 6.9 mph in its narrow central axis, which is located less than 18 miles from shore between Key Largo and North Palm Beach. Farther along it is joined by the Antilles Current, coming up &om the southeast, and the merging flow, broader and moving more slowly, continues northward and then northeastward, where it roughly parallels the 100-fathom curve as far as Cape Hatteras.

The Kuro Shio is the Pacific Ocean's equivalent to the Gulf Stream. A large part of the water of the North Equatorial current turns northeastward cast of Luzon and passes the cast coast of Taiwan to form this current. South of Japan, the Kuro Shio flows in a northeasterly direction, parallel to the Japanese islands, of Kyushu, Shikoku, and Honshu. According to Ocean Passages of the World, the top speed of the Kuro Shio is about the same as that of the Gulf Stream. The Gulf Stream's top flow rate is 156.5 statute miles per day (6.52 mph) and the Kuro Shio's is 153 statute miles per thy (6.375 mph). Other possible sites for the underwater generators are the East Australian Coast current, which flows at a top rate of 110.47 statute miles per day (4.6 mph), and the Agulhas current off the southern tip of South Africa, which flows at a top rate 01139.2 statute miles per day (5.8 mph). Another possible site for these generators is the Strait of Messina, the narrow opening that separates the island of Sicily from Italy, where the current's steady counter-clockwise rotation is produced—not by the wind—but by changing water densities produced by evaporation in the Mediterranean. Oceanographic current data will suggest other potential sites where such generators would be best placed. Therefore, there is a need for still further means of producing electricity in an efficient, non-fossil fuel manner yet which is usable in a variety of locations utilizing currents at the surface of the ocean.

Running water from rivers has long been used to power machinery and, more recently, to generate electricity. The majority, if not all, of the electricity produced by running water is produced by high efficiency hydroelectric power plants located in dams. Due to ecological, economical, and/or topological factors, there are relatively few sites that are suitable for dam construction. There are, however, numerous rivers that have sufficient current to produce sufficient quantities of electricity, if they can be properly tapped. There have been various proposals in the past to tap the energy available in river current without the use of dams. To the knowledge of the inventor of the present invention, none of these proposals has successfully put waterpower to use to produce energy in sufficient quantities. Therefore, there is a need for a means for producing electricity from the flow of water in a river that does not require that the river be dammed.

Finally, many states have passed laws requiring power companies to purchase surplus electricity from private generation facilities. As this is the case, there is an incentive for people who have the ability to generate power, such as those living on fast moving rivers, to install generation systems. However, the cost of such systems has, heretofore, been too high to justify such an investment. Therefore, there is a need for a relatively low cost power plant that may be installed by consumers living on fast moving rivers.

As can be seen from the foregoing, there is a need for means of producing electricity without the use of fossil fuels that is efficient, that is usable in a variety of locations, that may be adapted to utilize currents at the surface of the ocean, that may produce electricity from the flow of water in a river without requiring that the river be dammed, and that may be manufactured at a relatively low cost so as to allow it to be installed by consumers living on fast moving rivers.

SUMMARY OF THE INVENTION

The above cited needs are achieved by a floating power generating device that can be located in a fast moving body of water. In its most basic form, the floating power generating device of the present invention includes a support frame having a pair of buoyant pontoons, a power generator mounted to the support frame between the pontoons, an electrical cable in electrical communication with the power generator, and means for maintaining the floating power generating device in a substantially fixed position within the flow of water. The power generator includes a stator in fixed relation to the support frame and a rotor rotatably disposed about the stator. One of the rotor and the stator includes at least one magnet and the other another includes a plurality of windings of wire, with the magnets preferably disposed within the rotor. The rotor has an outer surface and at least one fin disposed upon the outer surface. The fin is, or fins are, dimensioned to turn the rotor about the stator when engaged by the flow of water.

The floating power generating device preferably includes at least one stabilizer element. In the preferred embodiment, four stabilizer elements are included and each is attached to and extends downward from the pontoons. In such embodiments, the four stabilizer elements are disposed upon the pontoons and dimensioned such that the stabilizer elements prevent the power generator from contacting a bottom of a water body. The frame of the floating power generating device preferably includes a cover, which is adapted to look like a rock or other natural feature.

In the preferred embodiment of the invention, the power generator is mounted in perpendicular relation to the pontoons and fin of the rotor is a plurality of fins that extending axially from the outer surface of the rotor. In such embodiments, it is also preferred that there be some means, such as brackets or the like, for raising and lowering the power generator relative to the frame. In some embodiments, the device includes a means, such as a door, for preventing a flow of water from contacting the at least one fin of the rotor. This means may be in addition to, or in place of, the means for raising and lowering the power generator.

Some embodiments of the floating power generating device include a front brace and a rear brace and have the stator of the power generator mounted between the front brace and the rear brace in substantially parallel relation to the pontoons. In such embodiments, the fin of the rotor is preferably at least one spiral fin disposed upon the outer surface of the rotor. This spiral fin acts in a manner similar to an aircraft turbine and acts to rotate the stator when the flowing water engages it. In such embodiments, it is also preferred that the front brace and the rear brace be dimensioned to extend downward such that the rotor of the power generating device is completely submerged below the surface of the flow of water.

In some embodiments, the means for maintaining the floating power generating device in a substantially fixed position within the flow of water is a support cable extending to at least one shore. In such embodiments, it is preferred that the electrical cable be disposed within the support cable, or that the support cable and the electrical cable be a single cable.

Finally, some embodiments of the floating power generating device include a transformer in electrical communication with the power generator. In such embodiments, the transformer is adapted to transform a flow of direct current power to a flow of alternating current power.

The present invention also includes a power generation system. The power generation system includes the floating power generating device, as described above, and an electrical junction box in electrical communication with the electrical cable of the floating power generating device. Some embodiments of the power generation system include a transformer in electrical communication with the electrical junction box and the electrical cable of the floating power generating device. Other embodiments include an electrical power meter disposed between the floating power generating device and an electrical power grid. In such embodiments, the electrical power meter is adapted to measure a flow of power from the floating power generating device to the electrical power grid. Other embodiments of the system include a battery in communication with the electrical junction box and the floating power generating device for storing power generated by the floating power generating device. Still other embodiments include an automated switch for switching a flow of power to a home when there is sufficient demand for the flow of power by the home and for switching a flow of power to the electrical power grid when there is insufficient demand for the flow of power by the home.

Therefore, it is an aspect of the invention to provide a floating power plant that uses a flow of water thereunder to produce electricity.

It is a further aspect of the invention to provide a floating power plant that produces electricity without the use of fossil fuels.

It is a further aspect of the invention to provide a floating power plant that is efficient It is a further aspect of the invention to provide a floating power plant that is usable in a variety of locations.

It is a further aspect of the invention to provide a floating power plant that may be adapted to utilize currents at the surface of the ocean.

It is a further aspect of the invention to provide a floating power plant that may produce electricity from the flow of water in a river without requiring that the river be dammed.

It is a still further aspect of the invention to provide a floating power plant that may be manufactured at a relatively low cost so as to allow it to be installed by consumers living on fast moving rivers.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

Figure 1:
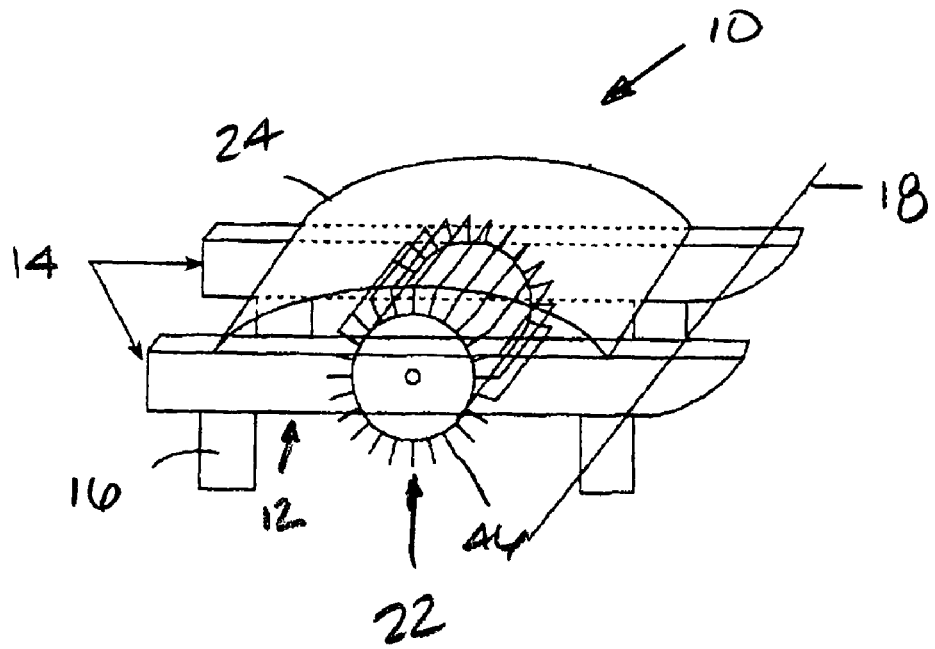
FIG. 1 is a perspective view of the preferred embodiment of the floating power generating device of the present invention.
Figure 2:
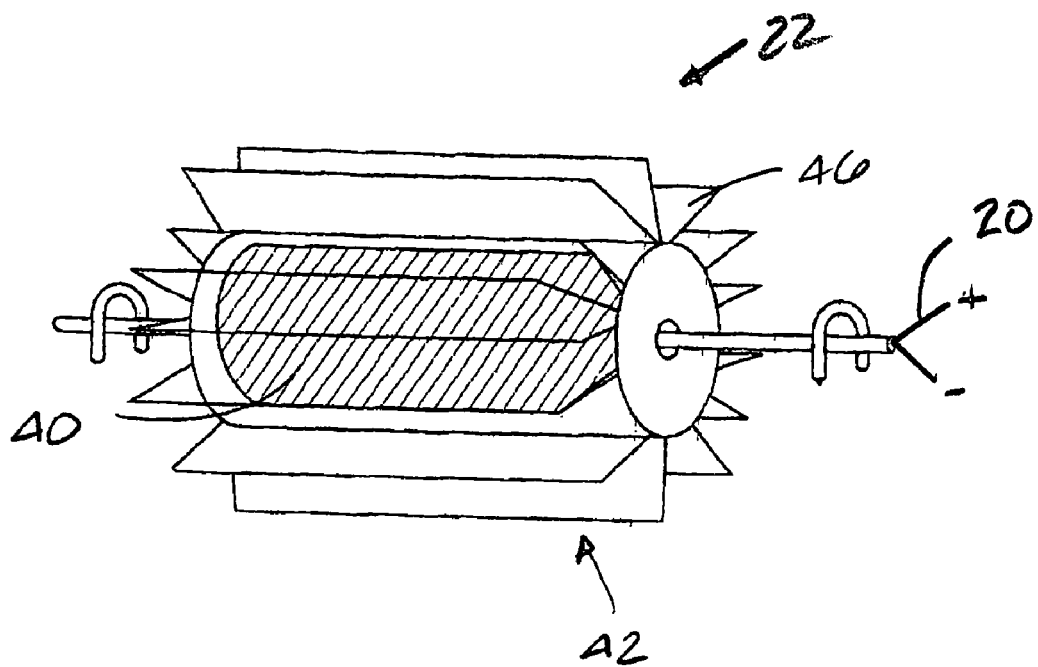
FIG. 2 is a perspective view of the stator and rotor of the power generating device of FIG. 1.

Referring first to FIGS. 1 and 2, the power generating device 10 of the present invention includes a support frame 12, a power generator 22 and a cable 18. The support frame 14 is preferably rectangular in shape and includes at least two floating pontoons 14. The floating pontoons 14 are made of a buoyant material and are designed so as to allow the device 10 to remain afloat while reducing the amount of turbulence generated by each pontoon 14. Stabilizer elements 16 preferably extend downward from the pontoons 14. The stabilizer elements 16 are preferably four rudder-like fins that help to keep the pontoons straight in the water and are also disposed upon the pontoons 14 and sized such that they will prevent the generator 22 from contacting the bottom of the river in the event that water levels drop. However, other embodiments utilize a single stabilizer element 16, preferably formed in the shape of a rudder, which stabilizes the device 10 within the flow of water and also acts in concert with the front portions of the pontoons 14 to keep the generator 22 from contacting the bottom of the river or other water body.

As shown in FIG. 1, the frame 12 preferably also includes a cover 24 thereon. The cover 24 is intended to protect the generator from damage due to snow, ice and other debris and is depicted in FIG. 1 as merely a curved sheet of material that extends over the top of the generator 22. However, in some embodiments the cover 24 is be adapted to look like a rock or other natural feature to disguise the device 10.

The power generator 22 is mounted to the frame 12. The power generator 22 is similar to many known generators and includes an internal stator 40, which is mounted to the frame such that it held stationary and a rotor 42 that is rotatably mounted on bearings or the like to rotate around the stator 40. The rotor 42 includes fins 46, which engage water flowing past the device 10 to move the rotor 42 around the stator 40 in a manner well known in the power generation art. In the preferred embodiment, magnets (not shown) are mounted within the rotor 42 and create a magnetic field about the stator 40, which includes a plurality of windings of wire (not shown) therein. This arrangement is preferred as it simplifies the process of sealing of the electrical components from the water. However, in other embodiments, the magnets may be disposed within the stator 40 and the windings mounted within the rotor 42. The magnetic field created relative to the windings produces a flow of current through the stator 40. At least one wire 20 is in electrical communication with the stator 40 and is adapted to transmit the electrical current generated by the generator 20 to the cable 18. In some embodiments of the invention, additional electronic circuitry (not shown) is located on the frame 12 to transfer the power from the leads 20 attached to the generator 22 to the cable 18. In still others, the device 10 includes an integral transformer (not shown) for transforming the power generated by the power generator 22 from direct current to alternating current.

Figure 6:
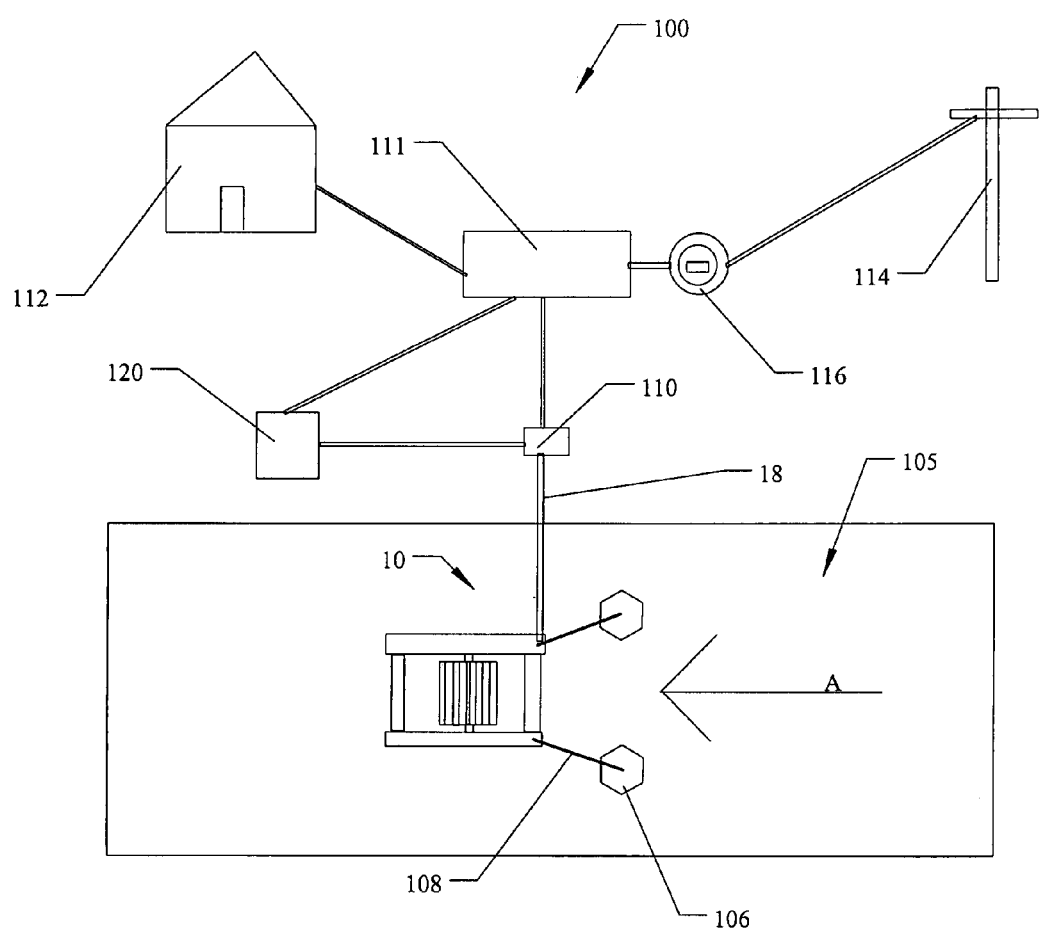
FIG. 6 is a diagrammatic view of the power plant system of the present invention.

The cable 18 of FIG. 1 serves two purposes. The cable 18 allows the device 10 to be secured in a desired location across a river and also acts to transmit the power generated by the power generator 22. The cable 18 of FIG. 1 preferably includes a pair of separate electrical leads mounted therein such that the power transmission and anchoring functions are not performed by the same cable. However, in some embodiments of the invention, the same cable 18 performs both functions. In still other embodiments, multiple anchors, such as anchors 106 shown in FIG. 6, are used to secure the device 10 in place within the water and the cable 18 is merely an electrical cable that is used to transmit the power generated by the generator 22. It is readily apparent that, in embodiments in which the cable 18 acts to secure the device 10, suitable anchors or other attachments are provided both on the device 10 and at each end of the cable 18.

Once needed, the device 10 is secured and set afloat in any body of water hat has a fast-moving current. The power generator 22 is then lowered such that the water flow will turn the fins 42 of the stator 42 contains the magnets that revolve around the stationary windings to produce electricity. In the embodiment of FIGS. 1 and 2, the power generator 22 is lowered until slightly less than one half of the diameter is of the stator 42 is below the surface of the water. However, in the embodiment of FIGS. 3-5, the stator 42 is fully submerged. In the preferred embodiment, the generator 22 may be lowered or raised via use of brackets (not shown) on the frame 12 to allow the user to stop the rotation of the rotor 42 for purpose of servicing the device 10 or to adjust the height of the rotor 42 relative to the surface of the water. In such embodiments, the generator 22 may be raised out of the water upon completion of use to stop power production. An alternative is to stop the flow of water that rotates the rotor 42. In such embodiments, a door or other shield (not shown) can be used to prevent the flow of water from reaching the fins 46 on the rotor 42.

Figure 3:
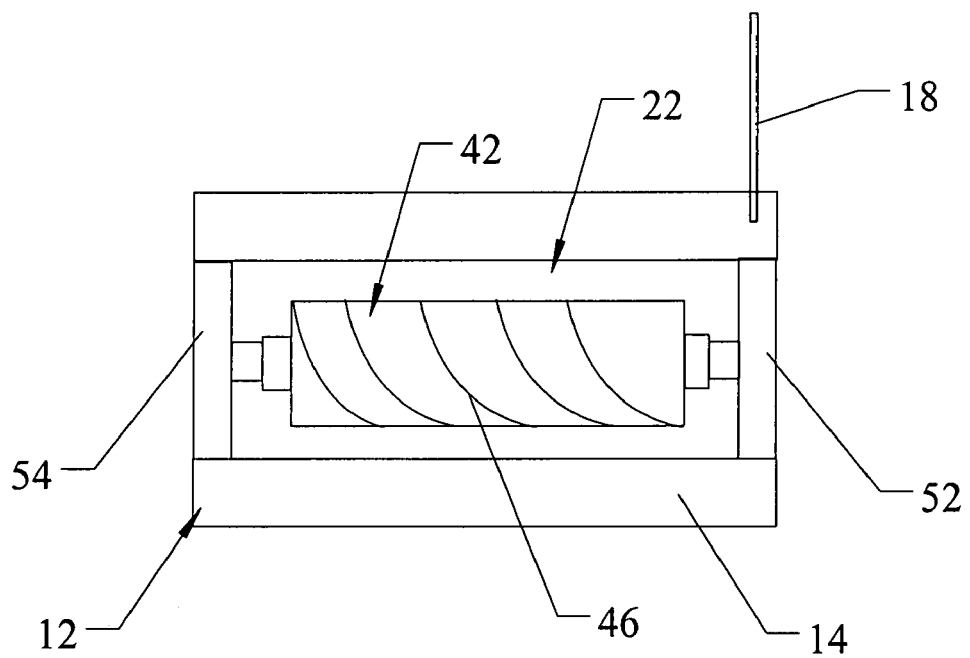
FIG. 3 is a top view of an alterative embodiment of the floating power generating device of the present invention utilizing a generator having a rotor with spiral fins.
Figure 4:
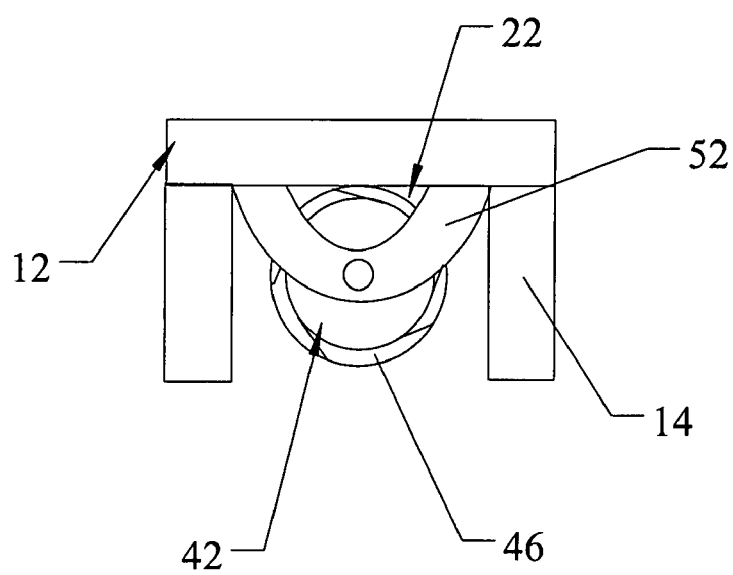
FIG. 4 is a side view of the floating power generating device of FIG. 3.
Figure 5:
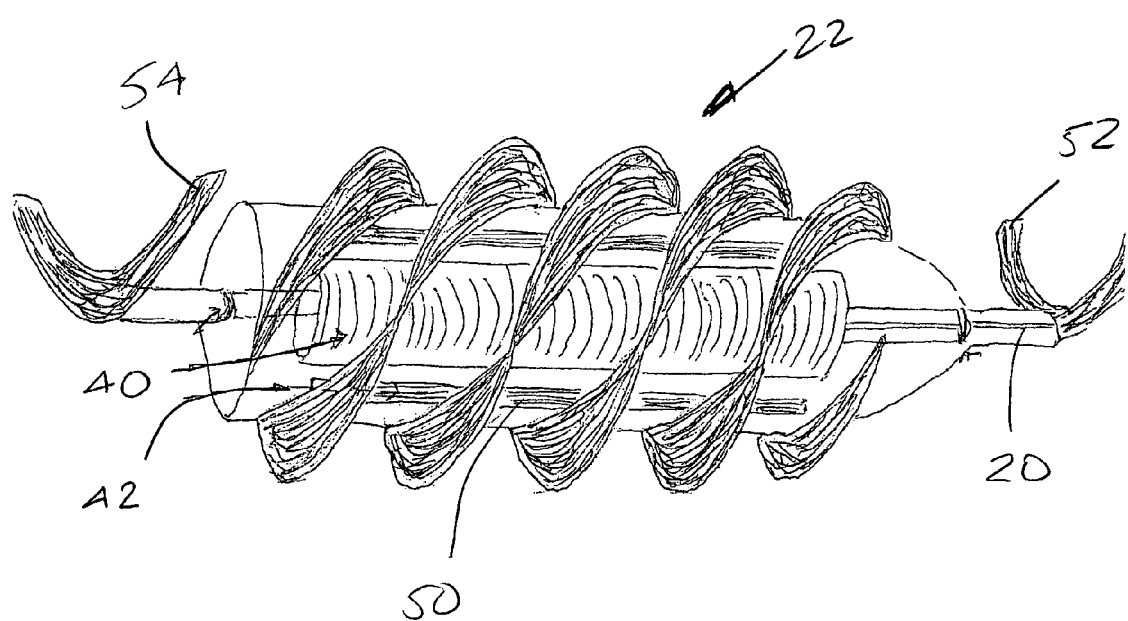
FIG. 5 is a perspective view of the power generator of the embodiments of FIGS. 3 and 4 in which the rotor includes spiral fins.

Referring now to FIGS. 3-5, an alternative embodiment of the power generation device 10 of the present invention is shown. This device 10 operates in substantially the same manner as the device 10 of FIGS. 1 and 2. However, in this embodiment the power generator 22 is mounted in parallel relation to the pontoons 14 and includes a stator 42 having a plurality of spiral blades 46 that cause the stator to rotate when a flow of water contacts them. In this embodiment, the frame 12 includes a front bracket 52 and a rear bracket 54 to which the stator 40 is mounted. The brackets preferably extend downward such that the entire power generator 22 is submerged below the surface of the water. As shown in FIGS. 4 and 5, these brackets 52, 54 are preferably "U" shaped in order to minimize the amount of water contacting them during operation. However, brackets 52, 54 having other shapes may be substituted to achieve similar results.

Referring now to FIG. 6, the power generation system 100 of the present invention is shown. The power generation system 100 includes a power generating device 10, such as those described with reference to FIGS. 1-5, which is mounted in a river 105 that flows in the direction denoted by arrow A. In the embodiment of FIG. 6, the cable 18 is merely an electrical transmission cable and the device 10 is held in position within the river by anchors 106 disposed on the bottom of the river and anchor cables 108 that secure the device 10 to the anchors 106.

In the system 100 of the present invention, the cable 18 is in electrical communication with at least one electrical junction box 110. In some embodiments, this junction box 100 is in communication with a transformer 111 for transforming the direct current produced by the generating device 10 into alternating current by a home 112 or transferred to a power grid 114. In embodiments in which power is transferred to a power grid 114, a meter 116 is placed between the transformer and the power grid 114 to measure the amount of electricity being transferred to the power grid 114 in order to allow the user to be reimbursed by a power company. In some embodiments, the junction box 110 includes an automated switch for switching a flow of power to the home 112 when there is sufficient demand for power by the home 112 and for switching a flow of power to the electrical power grid 114 when there is insufficient demand for power by the home 112. In some such embodiments, the switch may allow power to flow to both the home 112 and the electrical power grid 114. In still other embodiments, the junction box 110 is in electrical communication with an electrical storage device, such as a battery 120. In such embodiments, electrical energy is stored in the battery 120 and is later fed through the transformer 111 when power is needed.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A floating power generating device for generating electrical power from a flow of water, said device comprising:
    a support frame comprising a pair of buoyant pontoons;
    a power generator mounted to said support frame between said pontoons, said power generator comprising a stator in fixed relation to said support frame and a rotor rotatably disposed about said stator, wherein one of said rotor and said stator comprises at least one magnet, wherein another of said rotor and said stator comprises a plurality of windings of wire, wherein said rotor comprises an outer surface and at least one fin disposed upon said outer surface of said rotor, and wherein said at least one fin is dimensioned to turn said rotor about said stator when engaged by the flow of water,
    an electrical cable in electrical communication with said power generator;
    at least one stabilizer means for preventing said power generator from contacting a bottom of a water body; and
    means for maintaining said floating power generating device in a substantially fixed position within the flow of water.

2. The floating power generating device as claimed in claim 1 wherein said at least one stabilizer means element comprises four stabilizer elements, wherein each of said four stabilizer elements is attached to and extends downward from said pontoons, wherein said four stabilizer elements are disposed upon said pontoons and dimensioned such that said stabilizer elements prevent said power generator from contacting a bottom of a water body.

3. The floating power generating devices as claimed in claim 1 wherein said stator of said power generator is mounted in perpendicular relation to said pontoons and wherein said at least one fin of said rotor comprises a plurality of fins extending axially from said outer surface of said rotor.

4. The floating power generating device as claimed in claim 3 further comprising means for raising and lowering said power generator relative to said frame.

5. The floating power generating device as claimed in claim 1 further comprising means for preventing a flow of water from contacting said at least one fin of said rotor.

6. The floating power generating device as claimed in claim 1 wherein said frame further comprises a front brace and a rear brace, wherein said stator of said power generator is mounted between said front brace and said rear brace in substantially parallel relation to said pontoons, and wherein said at least one fin of said rotor comprises at least one spiral fin disposed upon said outer surface of said rotor.

7. The floating power generating device as claimed in claim 6 wherein said front brace and said rear brace are dimensioned to extend downward such that said rotor of said power generating device is completely submerged below a surface of said flow of water.

8. The floating power generating device as claimed in claim 1 wherein said at least one magnet is disposed within said rotor.

9. The floating power generating device as claimed in claim 1 wherein said frame further comprises a cover.

10. The floating power generating device as claimed in claim 9 wherein said cover is adapted to look like a rock.

11. The floating power generating device as claimed in claim 1 wherein said means for maintaining said floating power generating device in a substantially fixed position within the flow of water comprises a support cable extending to at least one shore, and wherein said electrical cable is disposed within said support cable.

12. The floating power generating device as claimed in claim 11 wherein said support cable and said electrical cable are a single cable.

13. The floating power generating device as claimed in claim 1 further comprising a transformer in electrical communication with said power generator, wherein said transformer is adapted to transform a flow of direct current power to a flow of alternating current power.

14. A power generation system comprising:
    a floating power generating device for generating electrical power from a flow of water, said device comprising:
        a support frame comprising a front brace and a rear brace and a pair of buoyant pontoons;
        a power generator mounted to said support frame between said pontoons, said power generator comprising a stator in fixed relation to said support frame and a rotor rotatably disposed about said stator wherein one of said rotor and said stator comprises at least one magnet, wherein another of said rotor and said stator comprises a plurality of windings of wire, wherein said rotor comprises an outer surface and at least one fin disposed upon said outer surface of said rotor, and wherein said at least one fin is dimensioned to turn said rotor about said stator when engaged by the flow of water, wherein said stator of said power generator is mounted between said front brace and said rear brace in substantially parallel relation to said pontoons, and wherein said at least one fin of said rotor comprises at least one spiral fin disposed upon said outer surface of said rotor;
        an electrical cable in electrical communication with said power generator; and
        means for maintaining said floating power generating device in a substantially fixed position within the flow of water; and
    an electrical junction box in electrical communication with said electrical cable of said floating power generating device.

15. The power generation system as claimed in claim 14 further comprising a transformer in electrical communication with said electrical junction box and said electrical cable of said floating power generating device, wherein said transformer is adapted to transform a flow of direct current power to a flow of alternating current power.

16. The power generation system as claimed in claim 14 further comprising an electrical power meter disposed between said floating power generating device and an electrical power grid, wherein said electrical power meter is adapted to measure a flow of power from the floating power generating device to the electrical power grid.

17. The power generation system as claimed in claim 14 further comprising a battery in communication with said electrical junction box and said floating power generating device for storing power generated by said floating power generating device.

18. The power generation system as claimed in claim 15 further comprising an electrical power meter disposed between said floating power generating device and an electrical power grid, wherein said electrical power meter is adapted to measure a flow of power from the floating power generating device to the electrical power grid.

19. The power generating system as claimed in claim 18 further comprising an automated switch for switching a flow of power to a home when there is sufficient demand for said flow of power by said home and for switching a flow of power to the electrical power grid when there is insufficient demand for said flow of power by said home.

20. The power generating system as claimed in claim 14 wherein said front brace and said rear brace of said frame of said floating power generating device are dimensioned to extend downward such that rotor of said power generating device is completely submerged below a surface of said flow of water.

* * * * *